US009793780B2

(12) United States Patent
Minoshima et al.

(10) Patent No.: US 9,793,780 B2
(45) Date of Patent: Oct. 17, 2017

(54) INDUCTION MACHINE

(71) Applicant: KABUSHIKI KAISHA TOYOTA JIDOSHOKKI, Kariya-shi, Aichi (JP)

(72) Inventors: Norimoto Minoshima, Kariya (JP); Taizo Kusadome, Kairya (JP); Yasuyuki Satake, Kariya (JP); Shunsuke Sawano, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 35 days.

(21) Appl. No.: 14/786,335

(22) PCT Filed: Dec. 13, 2013

(86) PCT No.: PCT/JP2013/083500
§ 371 (c)(1),
(2) Date: Oct. 22, 2015

(87) PCT Pub. No.: WO2014/174721
PCT Pub. Date: Oct. 30, 2014

(65) Prior Publication Data
US 2016/0094109 A1 Mar. 31, 2016

(30) Foreign Application Priority Data
Apr. 26, 2013 (JP) ................. 2013-093907

(51) Int. Cl.
*H02K 9/06* (2006.01)
*H02K 5/173* (2006.01)
(Continued)

(52) U.S. Cl.
CPC ............. *H02K 9/06* (2013.01); *H02K 5/1732* (2013.01); *H02K 7/083* (2013.01); *H02K 17/16* (2013.01)

(58) Field of Classification Search
CPC .. H02K 9/06; H02K 9/18; H02K 1/20; H02K 5/20
See application file for complete search history.

(56) References Cited

U.S. PATENT DOCUMENTS 2,519,065 A * 8/1950 Reardon .................. H02K 9/00
310/62
4,115,030 A 9/1978 Inagaki et al.
(Continued)

FOREIGN PATENT DOCUMENTS

CN 102064634 A 5/2011
CN 202309269 U 7/2012
(Continued)

OTHER PUBLICATIONS

Communication dated Oct. 4, 2016, from the Japanese Patent Office in counterpart Japanese application No. 2015-513488.
(Continued)

*Primary Examiner* — Dang Le
(74) *Attorney, Agent, or Firm* — Sughrue Mion, PLLC

(57) ABSTRACT

An induction machine includes: a stator having a stator core and a coil; a rotor, which has a shaft, a rotor core secured to the shaft, and a secondary conductor; a bearing supporting the shaft; a cooling fan having a blade; and a cooling fan fixture. The secondary conductor includes a rotor bar and an end ring. The blade is located axially outward of the end ring, and the distal end of the blade in the axial direction extends axially outward of the coil end of the coil. The cooling fan has a securing portion located radially inward of the end ring and a cylindrical extended portion extending from the securing portion to the blade. The securing portion is secured to the rotor with the cooling fan fixture. The bearing is located axially inward of the distal end of the blade.

13 Claims, 7 Drawing Sheets

(51) Int. Cl.
*H02K 7/08* (2006.01)
*H02K 17/16* (2006.01)

(56) References Cited

U.S. PATENT DOCUMENTS

| | | | |
|---|---|---|---|
| 5,343,101 A | 8/1994 | Matani | |
| 5,925,960 A * | 7/1999 | Hayes | H02K 9/06 29/889.3 |
| 6,891,290 B2 * | 5/2005 | Nagayama | H02K 1/32 310/58 |
| 7,462,964 B2 * | 12/2008 | Nagayama | H02K 9/14 310/58 |
| 2006/0261687 A1 | 11/2006 | Nagayama et al. | |
| 2013/0119796 A1 | 5/2013 | Maeda | |

FOREIGN PATENT DOCUMENTS

| | | |
|---|---|---|
| EP | 0 920 110 A2 | 6/1999 |
| JP | 42-8413 Y1 | 5/1967 |
| JP | 52-101401 A | 8/1977 |
| JP | 1-174233 A | 7/1989 |
| JP | 4-304143 A | 10/1992 |
| JP | 7-135747 A | 5/1995 |
| JP | 7-143709 A | 6/1995 |
| JP | 9-84301 A | 3/1997 |
| JP | 3730531 B2 | 1/2006 |
| JP | 4846065 B1 | 12/2011 |

OTHER PUBLICATIONS

International Search Report of PCT/JP2013/083500, dated Mar. 11, 2014. [PCT/ISA/210].
Translation of International Preliminary Report on Patentability dated Oct. 27, 2015 issued in corresponding Application No. PCT/JP2013/083500.
Communication dated Jan. 4, 2017 from the European Patent Office in counterpart Application No. 13882814.0.

* cited by examiner

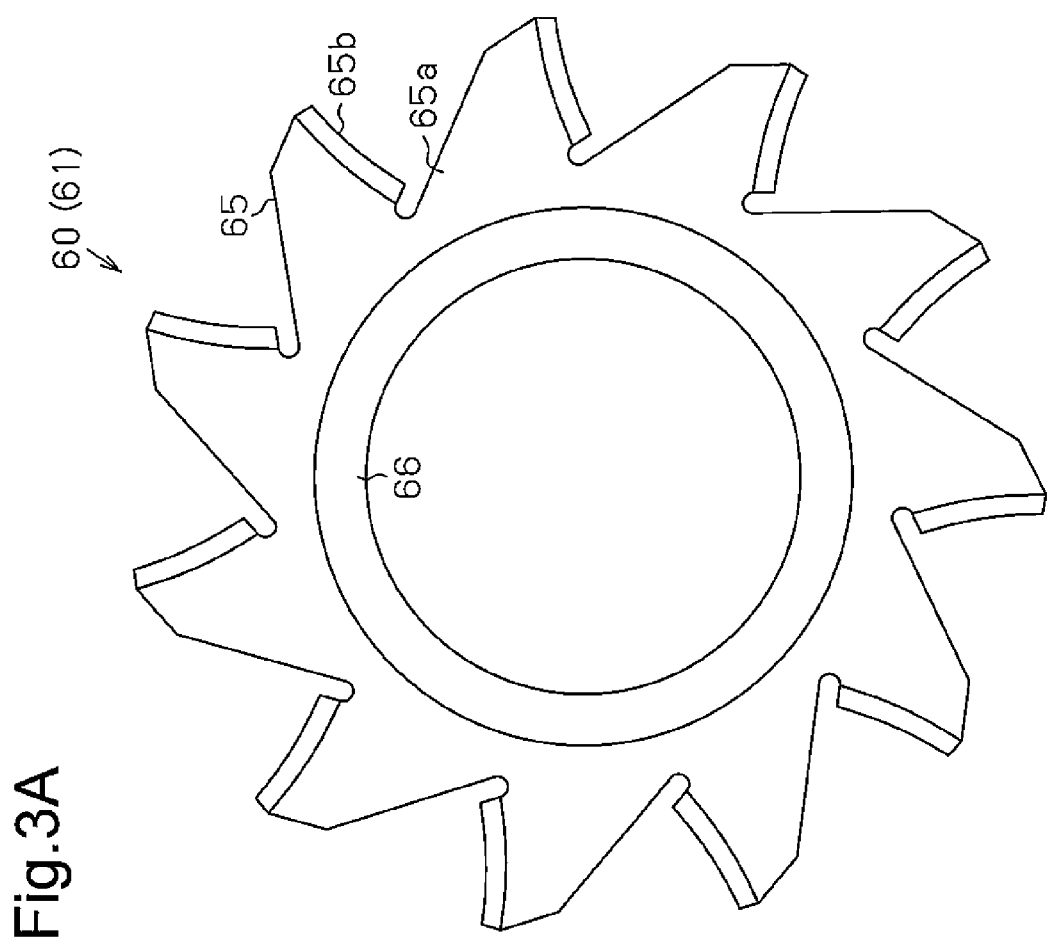

INDUCTION MACHINE

CROSS REFERENCE TO RELATED APPLICATIONS

This application is a National Stage of International Application No. PCT/JP2013/083500 filed Dec. 13, 2013, claiming priority based on Japanese Patent Application No. 2013-093907, filed Apr. 26, 2013, the contents of all of which are incorporated herein by reference in their entirety.

TECHNICAL FIELD

The present invention relates to an induction machine.

BACKGROUND ART

Patent Document 1 discloses a rotating electric machine that includes a stator and a rotor, which is arranged to face the stator. The rotor includes a laminated iron core, which is formed by laminating thin plates, conductive bars, which are inserted in holes that extend axially in the laminated iron core, and end rings located on the opposite ends of the laminated iron core in the axial direction. In a seventh embodiment of the above publication, each conductive bar has tapered ends, the end rings have tapered holes that match with the shape of the ends of the conductive bars, and the ends of the conductive bars are inserted in the holes of the end rings. A cooling fin and an imbalance correcting protrusion are integrally formed with each end ring in advance.

Patent Document 2 discloses a self-ventilated vehicle main electric motor that allows cooling air to flow inside by arranging axial flow fans on the opposite ends of the rotor iron core. In Patent Document 2, the width of the blades of each axial flow fan is reduced so that the distance from a bracket and a bearing box that face the axial flow fan to the blades of the axial flow fan is greater than the dimension of the blades in the axial direction at the average diameter position of the blades.

PRIOR ART DOCUMENTS

Patent Documents

Patent Document 1: Japanese Patent No. 3730531
Patent Document 2: Japanese Laid-Open Patent Publication No. 9-84301

SUMMARY OF THE INVENTION

Problems that the Invention is to Solve

With the structure in which the cooling fans are secured to the end rings, if the rotor of the induction machine is rotated at a high speed, stirring resistance of air and centrifugal force act on the cooling fans, and the strength of the components of the rotor and the components secured to the rotor may possibly be insufficient. For example, stress is generated at joints between the cooling fans and rotor bars, and the strength of the rotor may be insufficient. Also, with the structure in which the cooling fans are secured to the shaft, spaces for arranging bearings radially inward of the cooling fans are eliminated, and it becomes necessary to increase the axial dimension of the induction machine to provide spaces for arranging the bearings.

Accordingly, it is an objective of the present invention to provide an induction machine that has an increased strength against stress generated by rotation of cooling fans and a reduced size in the axial direction.

Means for Solving the Problems

To achieve the foregoing objective and in accordance with one aspect of the present invention, an induction machine is provided that includes a housing, a stator, a rotor, a bearing, a cooling fan, and cooling fan securing means. The stator is arranged in the housing and includes a stator core and a coil. The rotor includes a shaft, a rotor core secured to the shaft, and a secondary conductor. The secondary conductor includes a rotor bar and an end ring. The bearing is arranged in the housing and rotationally supports the shaft. The cooling fan is arranged in the housing and includes a blade. The cooling fan securing means secures the cooling fan to the rotor. The blade is located axially outward of the end ring. The distal end of the blade in an axial direction extends axially outward of a coil end of the coil. The cooling fan includes a securing portion, which is located radially inward of the end ring, and a cylindrical extended portion, which extends from the securing portion to the blade. The securing portion is secured to the rotor with the cooling fan securing means. The bearing is located axially inward of the distal end of the blade.

According to the above-described configuration, as compared to a case in which the cooling fan is secured to the end ring, strength against stress generated by rotation of the cooling fan is increased. Furthermore, with the bearing being located axially inward of the distal end of the blade, the axial dimension of the induction machine is prevented from increasing, and the size in the axial direction is reduced.

The cooling fan securing means may be a securing member, which sandwiches the securing portion between the securing member and the rotor core in the axial direction. In this case, the securing member may also serve as a rotor core holder. Furthermore, the rotational balance of the rotor can be adjusted with the securing member.

The cooling fan securing means may be a securing member, which sandwiches the securing portion between the securing member and a protrusion of the shaft in the axial direction. In this case, the rotational balance of the rotor can be adjusted with the securing member.

The cooling fan securing means may be a protrusion located on the shaft to sandwich the securing portion between the protrusion and the rotor core in the axial direction.

The blade may be located radially outward of an inner circumference of the end ring.

The cooling fan may be formed of a plate. In this case, the cooling fan can be formed by bending and drawing.

The blade may be thermally coupled to the end ring. In this case, heat generated in the end ring is transmitted to the cooling fan to cool the end ring.

The blade may be in contact with the end ring.

The cooling fan may include an end ring holder, which extends in the axial direction from the blade. In this case, the end ring is held such that the end ring does not expand radially outward due to centrifugal force.

The end ring holder may be positioned on an outer circumferential surface of the end ring.

The end ring holder may engage with a recess formed in an end surface of the end ring.

EFFECTS OF THE INVENTION

According to the present invention, the strength against stress generated by rotation of the cooling fan is increased and the size in the axial direction is reduced.

BRIEF DESCRIPTION OF THE DRAWINGS

FIG. 3A is a front view of the cooling fan;

FIG. 3B is a side view of the cooling fan;

MODES FOR CARRYING OUT THE INVENTION

One embodiment of the present invention will now be described with reference to the drawings.

Figure 1:
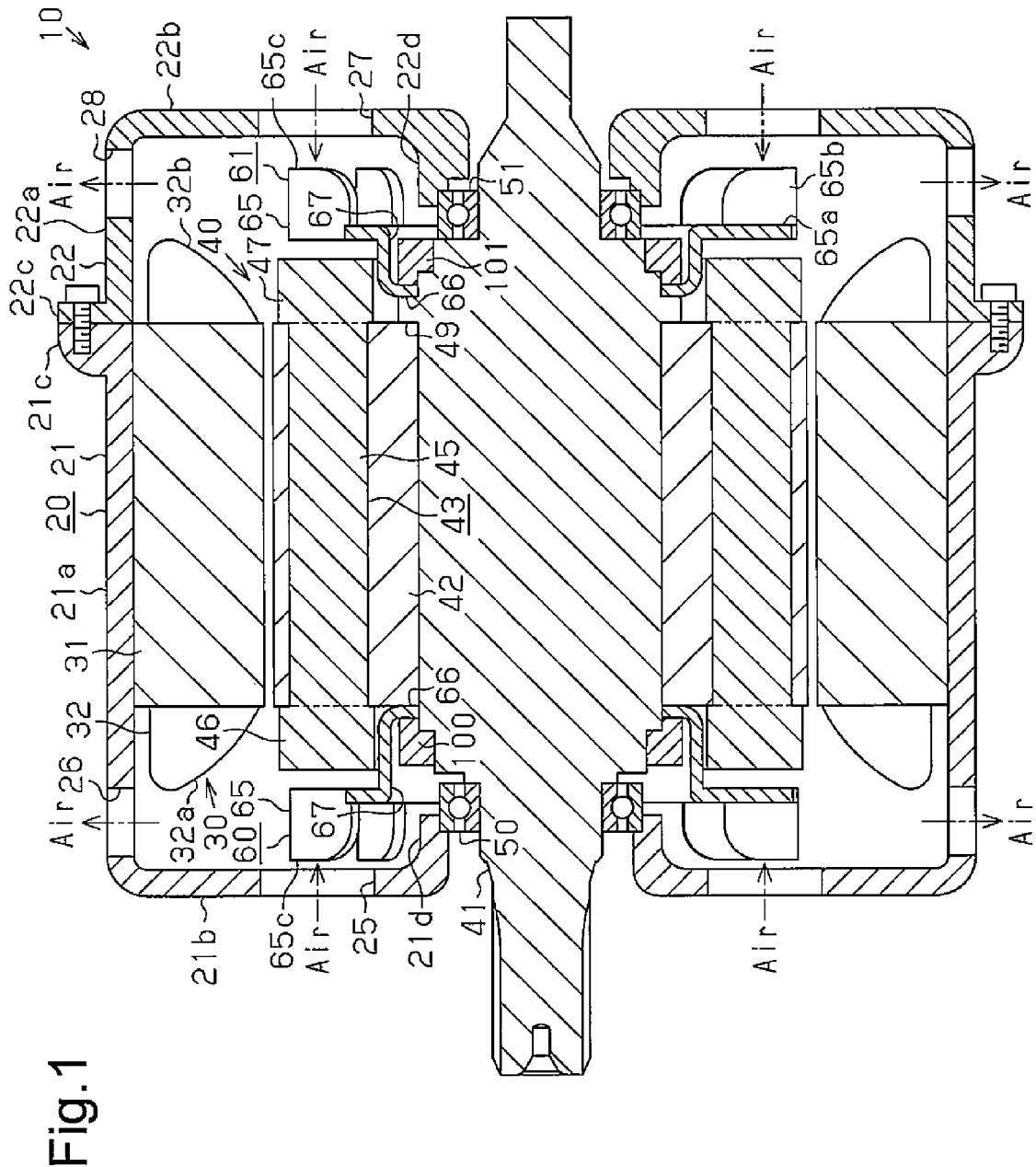
FIG. 1 is a schematic longitudinal cross-sectional view of an induction machine according to one embodiment.

As shown in FIG. 1, an induction machine 10 includes a housing 20, a stator 30, a rotor 40, bearings 50, 51, and cooling fans 60, 61. The rotor 40 is supported by the housing 20 with the bearings 50, 51 to be located radially inward of the stator 30, which is secured to the housing 20.

The housing 20, as the overall shape, has a cylindrical shape with the axial ends closed. More specifically, the housing 20 includes a first housing component 21 and a second housing component 22. The first housing component 21 includes a cylindrical main body portion 21a and a disk-like front plate 21b, which closes a first end opening of the main body portion 21a. The second housing component 22 includes a cylindrical main body portion 22a and a disk-like rear plate 22b, which closes a first end opening of the main body portion 22a. The first housing component 21 and the second housing component 22 are formed of metal material (for example, aluminum).

A flange 21c is formed on the rim of the opening of the first housing component 21. A flange 22c is formed on the rim of the opening of the second housing component 22. Screws that extend through the flange 22c are threaded into the flange 21c so that the first housing component 21 and the second housing component 22 are coupled and secured to each other.

Cooling of the induction machine 10 is performed by an open system, which includes an air inlet 25 formed in the front plate 21b and an air outlet 26 formed in the end portion of the main body portion 21a close to the front plate 21b. The system further includes an air inlet 27 formed in the rear plate 22b and an air outlet 28 formed in the end portion of the main body portion 22a close to the rear plate 22b.

A shaft 41 extends through a rotor core 42 of the rotor 40, and the shaft 41 is rotationally supported by the bearings 50, 51. More specifically, a first end region of the shaft 41 is rotationally supported by a cylindrical shaft support 21d, which projects from the front plate 21b, via the bearing 50. Furthermore, a second end region of the shaft 41 is rotationally supported by a cylindrical shaft support 22d, which projects from the rear plate 22b, via the bearing 51. That is, the bearings 50, 51 are arranged in the housing 20, and while the bearing 50 rotationally supports the first end region of the shaft 41, the bearing 51 rotationally supports the second end region of the shaft 41. The first end, that is, the output end of the shaft 41 projects to the outside of the housing 20 through the front plate 21b, and a transmission (not shown) is connected to the output end.

The stator 30 is secured to the inner circumferential surface of the main body portion 21a of the first housing component 21. That is, the stator 30 is arranged in the housing 20 and includes an annular stator core 31, which is secured to the inner circumferential surface of the main body portion 21a, and a coil 32, which is wound around teeth (not shown) of the stator core 31. The stator core 31 is formed by stacking electrical steel sheets.

The stator 30 is inserted in the main body portion 21a through a second end opening of the main body portion 21a and is secured to the inner circumferential surface of the main body portion 21a by shrink fitting.

The rotor 40 is located radially inward of the stator 30. The rotor 40 includes the shaft 41, the rotor core 42, and a secondary conductor 43.

The rotor core 42 is secured to the shaft 41. The rotor core 42 is formed by stacking electrical steel sheets. The rotor core 42 is sandwiched between a securing member 100, which will be discussed below, and a protrusion (flange) 49 formed on the shaft 41 to be restricted from moving in the axial direction of the shaft 41.

Figure 2:
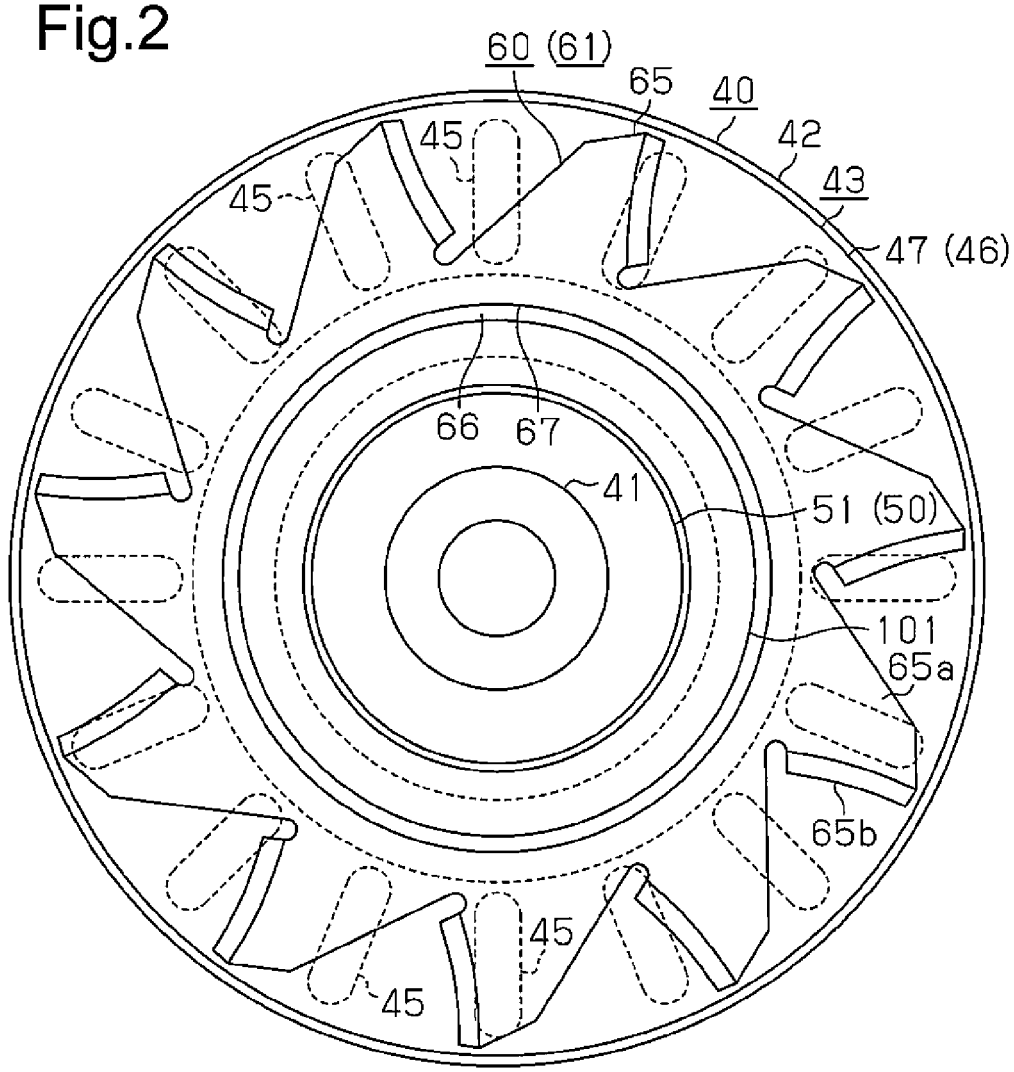
FIG. 2 is a schematic side view of the cooling fan and the rotor of the induction machine shown in FIG. 1.

As shown in FIGS. 1 and 2, the secondary conductor 43 has rotor bars 45 and end rings 46, 47. The rotor bars 45 are embedded in the rotor core 42 and are arranged to extend through the rotor core 42 in the axial direction. The end ring 46 is located on the first end surface of the rotor core 42 and is coupled to first ends of the rotor bars 45. The end ring 47 is located on the second end surface of the rotor core 42 and is coupled to second ends of the rotor bars 45. The secondary conductor 43 (the rotor bars 45 and the end rings 46, 47) are formed of aluminum and, more specifically, are formed by aluminum die casting.

The cooling fans 60, 61 are arranged in the housing 20. The cooling fans 60, 61 have structures similar to each other and are formed of plate. The cooling fans 60, 61 are formed by bending and drawing.

Figure 4:
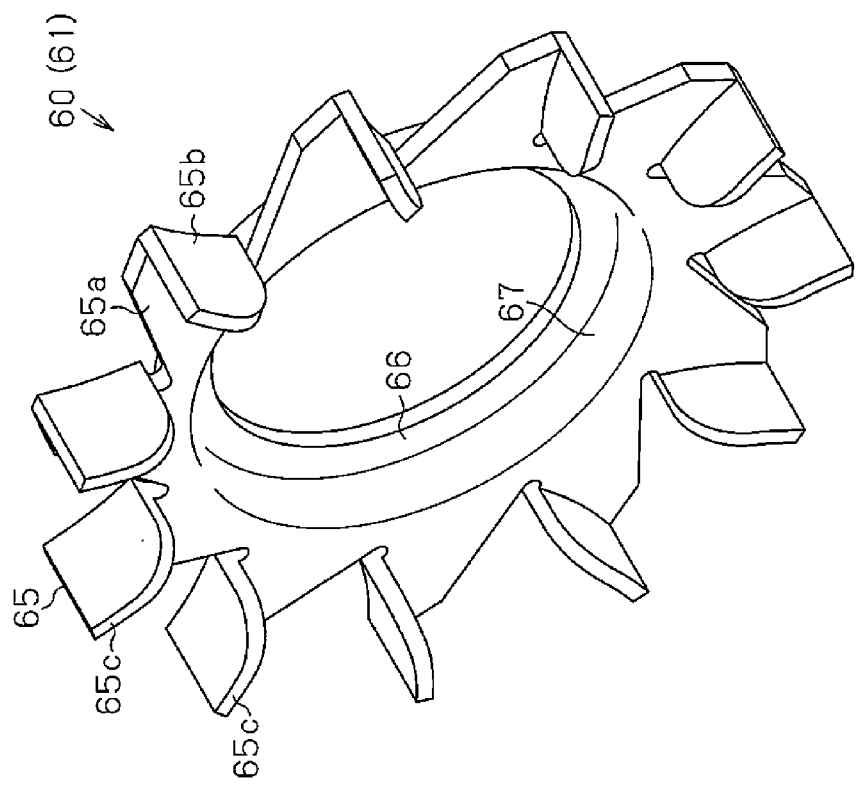
FIG. 4 is a perspective view of the cooling fan.

As shown in FIGS. 3A, 3B, and 4, the cooling fans 60, 61 are separate from the end rings 46, 47 and are formed of material with a high strength (for example, an aluminum alloy and stainless-steel). Each of the cooling fans 60, 61 includes blades 65, a securing portion 66, and an extended portion 67. The securing portion 66, which is secured to the shaft 41, has a disk-like (flange-like or ring-like) shape and permits the shaft 41 to pass through. The cylindrical extended portion 67 extends in the axial direction from the periphery of the disk-like securing portion 66. The blades 65 are formed on the distal end of the cylindrical extended portion 67. Each of the blades 65 has a flat portion 65a and a curved surface portion 65b for receiving air. The flat portion 65a extends in a radial direction perpendicular to the axis of the shaft 41, and the curved surface portion 65b is formed on the outer circumferential region of the flat portion 65a to bend with respect to the flat portion 65a and extend in the axial direction. The curved surface portions 65b are located at equal angular intervals in the circumferential direction. The end surfaces of the curved surface portions 65b in the axial direction correspond to distal ends 65c of the blades 65 in the axial direction.

As the cooling fans 60, 61 rotate, the curved surface portions 65b produce an air flow in a direction radially outward of the shaft 41. That is, outside air is introduced into the housing 20 through the air inlet 25 formed in the front plate 21b of the housing 20 and the air inlet 27 formed in the rear plate 22b of the housing 20, and the air is discharged to the outside of the housing 20 through the air outlet 26 formed in the main body portion 21a of the housing 20 and the air outlet 28 formed in the main body portion 22a of the housing 20.

Furthermore, the cylindrical extended portion 67 of the cooling fan 60 extends from the blades 65 to a region radially inward of the end ring 46, and the securing portion 66 is secured to the rotor 40 with the securing member 100, which serves as cooling fan securing means (or a cooling fan fixture), in the region radially inward of the end ring 46. The securing member 100 is located in a region radially inward of the extended portion 67. That is, the cooling fan securing means corresponds to the securing member 100, which sandwiches the cooling fan 60 (more specifically, the securing portion 66) between the securing member 100 and the rotor core 42 in the axial direction. The securing member 100 is formed of iron and has a ring shape. The blades 65 of the cooling fan 60 are arranged axially outward of the end ring 46, and the distal ends 65c of the blades 65 in the axial direction extend axially outward of a coil end 32a of the coil 32 in the axial direction.

The cylindrical extended portion 67 of the cooling fan 61 extends from the blades 65 to a region radially inward of the end ring 47, and the securing portion 66 is secured to the rotor 40 with a securing member 101, which serves as cooling fan securing means (or a cooling fan fixture), in the region radially inward of the end ring 47. The securing member 101 is located in a region radially inward of the extended portion 67. That is, the cooling fan securing means corresponds to the securing member 101, which sandwiches the cooling fan 61 (more specifically, the securing portion 66) between the securing member 101 and the protrusion 49 of the shaft 41 in the axial direction. The securing member 101 is formed of iron and has a ring shape. The blades 65 of the cooling fan 61 are arranged axially outward of the end ring 47, and the distal ends 65c of the blades 65 in the axial direction extend axially outward of a coil end 32b of the coil 32.

The bearing 50 is located axially inward of the distal ends 65c of the blades 65 of the cooling fan 60. Similarly, the bearing 51 is located axially inward of the distal ends 65c of the blades 65 of the cooling fan 61.

Furthermore, the blades 65 of the cooling fan 60 are located radially outward of the inner circumference of the end ring 46. Similarly, the blades 65 of the cooling fan 61 are arranged radially outward of the inner circumference of the end ring 47.

When the cooling fans 60, 61 shown in FIGS. 3A, 3B, and 4 are mounted in the rotor 40, the securing members 100, 101 enter axially inward of the blades 65 of the cooling fans 60, 61 as shown in FIG. 1 so that the cooling fans 60, 61 are secured to the shaft 41 without elongating the axial dimension of the induction machine 10.

When the securing members 100, 101 are formed of heavy material, the securing members 100, 101 can be utilized as members for adjusting the rotational balance of the rotor 40 by partially reducing the weight of the securing members 100, 101 (for example, by forming holes).

Operation of the induction machine 10, which has the above described configuration, will now be described.

When the coil 32 is energized, a rotating magnetic field is generated in the stator 30. When the rotating magnetic field is generated, a secondary current flows in the secondary conductor 43 (the rotor bars 45 and the end rings 46, 47) due to electromagnetic induction. In this manner, when an induction current, that is, the secondary current flows in the secondary conductor 43, which functions as a current path for generating torque in the rotor 40, magnetic poles are generated in the rotor 40. Electromagnetic force acts between the magnetic poles generated in the rotor 40 and the rotating magnetic field generated in the stator 30, so that the rotor 40 is rotated.

The cooling fans 60, 61 also rotate as the rotor 40 rotate. The rotation of the cooling fans 60, 61 causes air (outside air) to be introduced into the housing 20 through the air inlets 25, 27 of the housing 20 in the axial direction and to be discharged to the outside of the housing 20 through the air outlets 26, 28 of the housing 20 via the blades 65 in the radial direction. The air discharges heat generated inside the housing 20.

Figure 10:
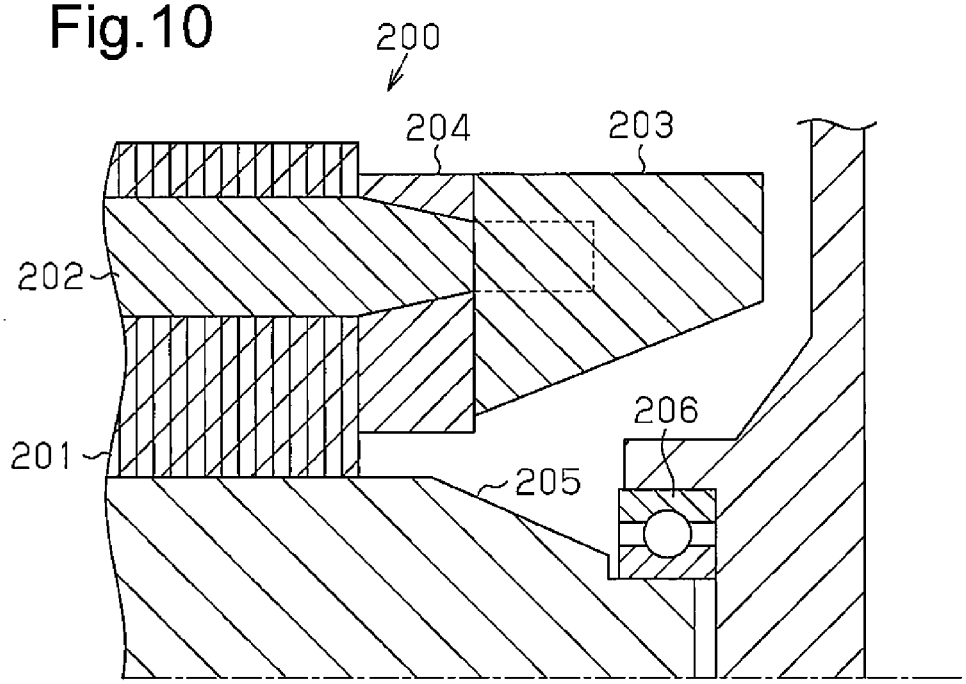
FIG. 10 is a schematic cross-sectional view of part of an induction machine according to a comparative example.
Figure 11:
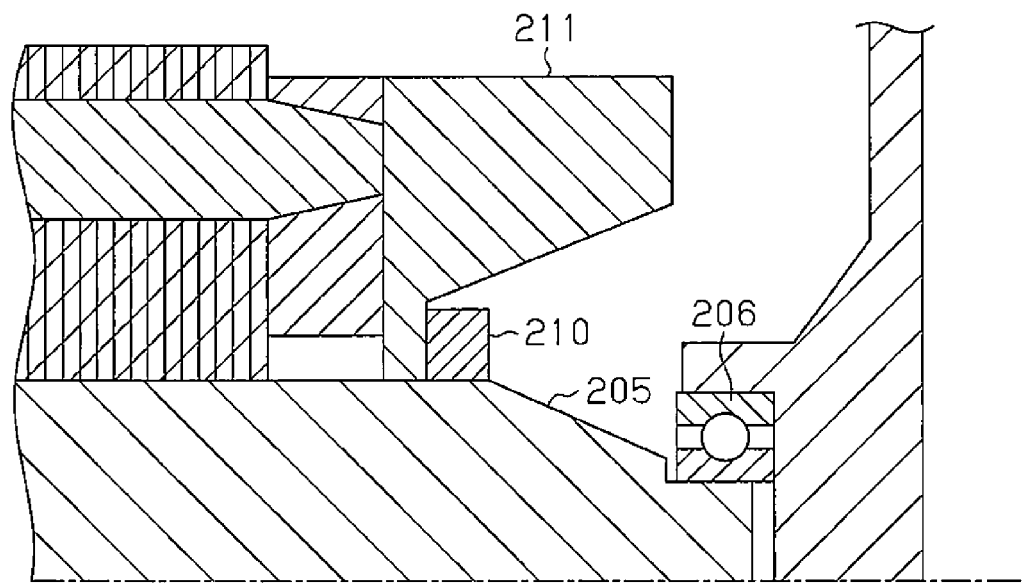
FIG. 11 is a schematic cross-sectional view of part of an induction machine according to a comparative example.

A comparative example is shown in FIG. 10. In FIG. 10, rotor bars 202 made of aluminum are inserted in the rotor core 201. An end ring 204 to which a cooling fan 203 is secured and integrated is fitted to the rotor bars 202. With this structure, when a rotor 200 is rotated at a high speed, the cooling fan 203 receives stirring resistance of air and centrifugal force, and a great stress is generated at joints between the cooling fan 203 and the rotor bars 202, and the strength of the rotor may possibly be insufficient. In a comparative example of FIG. 11, a cooling fan 211, which is a separate body from the rotor core, is secured to a shaft 205 with a securing member 210. In this case, a space for arranging the securing member 210 is necessary, and the axial dimension of the induction machine 10 needs to be increased to provide a space for arranging a bearing 206. In a case in which the cooling fan is integrated with a holding member that restricts the movement of the rotor core in the axial direction instead of using the securing member 210, the shape of the holding member may be complicated and the holding member may be difficult to manufacture.

In contrast, in the present embodiment, the end rings 46, 47 and the cooling fans 60, 61 are formed as separate bodies to maintain the strength even if the rotor 40 of the induction machine 10 is rotated at a high speed. Since the end rings 46, 47 need to conduct electricity, the end rings 46, 47 are formed of high-purity (for example, greater than or equal to 99%) aluminum, which has a low strength. However, the cooling fans 60, 61 can be formed of an aluminum alloy, which is a high-strength material. As described above, with the end rings 46, 47 and the cooling fans 60, 61 being separate bodies, the selectivity of material that can be used for forming the components is increased (appropriate material can be selected considering the strength).

Also, a section of each of the cooling fans 60, 61 required to secure each fan 60, 61 to the shaft 41, which is the section that includes the securing portion 66 and the extended portion 67, is cup-shaped. The cup shape can be formed by drawing a plate-like material. Thus, the securing portion 66 and the extended portion 67 of each of the cooling fans 60, 61 can enter the region radially inward of the corresponding one of the end rings 46, 47, and the entire cooling fans 60, 61 can be formed by drawing and bending a plate-like material. As a result, the induction machine 10 capable of rotating at a high speed can be easily manufactured without increasing the axial dimension of the induction machine 10.

The above described embodiment achieves the following advantages.

(1) The blades 65 of the cooling fans 60, 61 are arranged axially outward of the end rings 46, 47. The distal ends 65*c* of the blades 65 in the axial direction extend axially outward of the coil ends 32*a*, 32*b* of the coil 32. The cooling fans 60, 61 each include the securing portion 66, which is located radially inward of the end rings 46, 47, and the cylindrical extended portion 67, which extends from the securing portion 66 to the blades 65. The securing portion 66 is secured to the rotor 40 with the cooling fan securing means, which corresponds to the securing members 100, 101. Thus, as compared to a case in which the cooling fans 60, 61 are secured to the end rings 46, 47, stress generated by rotation of the cooling fans 60, 61 is reduced. Furthermore, the bearings 50, 51 are located axially inward of the distal ends 65*c* of the blades 65. Thus, the length in the axial direction is prevented from increasing, and the size in the axial direction is reduced.

(2) Since the cooling fan securing means corresponds to the securing member 100, which sandwiches the cooling fan 60 (more specifically, the securing portion 66) between the securing member 100 and the rotor core 42 in the axial direction, the securing member 100 also serves as a member for holding the rotor core 42 in the axial direction. Furthermore, the rotational balance of the rotor 40 can be adjusted with the securing member 100.

(3) Since the cooling fan securing means corresponds to the securing member 101, which sandwiches the cooling fan 61 between the securing member 101 and the protrusion 49 of the shaft 41 in the axial direction, the rotational balance of the rotor 40 can be adjusted with the securing member 101.

(4) The structure in which the blades 65 of the cooling fans are arranged radially outward of the inner circumference of the end rings 46, 47 is preferred in drawing in cooling air from the outside of the housing 20 and discharging the air to the outside of the housing 20 after the air is used for cooling.

(5) The cooling fans 60, 61 are easily formed by bending and drawing plates.

(6) Since cooling air is drawn into the housing 20 in the axial direction and is discharged from the housing 20 in the radial direction, components arranged on the outside surface of the housing 20 are also cooled.

The present invention is not limited to the above described embodiment, but may be embodied as follows, for example.

Figure 5:
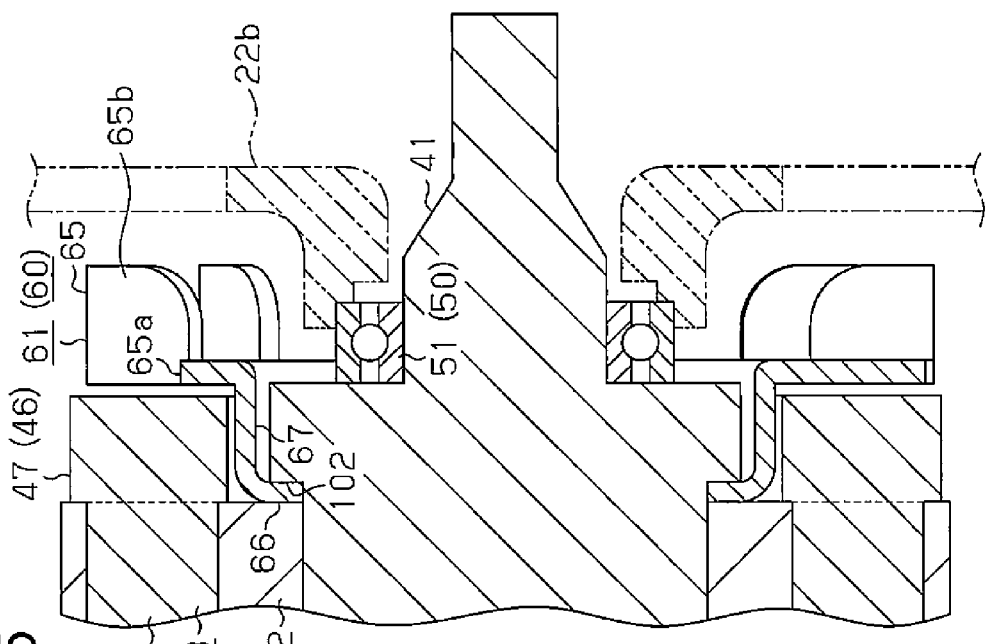
FIG. 5 is a schematic cross-sectional view of part of an induction machine according to a modification.

In FIG. 1, the cooling fans 60, 61 on the opposite ends are separately secured with the securing members 100, 101. Instead, as shown in FIG. 5, the cooling fan 61 (60) on one side may be sandwiched between the rotor core 42 and a protrusion 102 of the shaft 41. In this case, the cooling fan securing means corresponds to the protrusion 102 of the shaft 41, which sandwiches the cooling fan 61 between the protrusion 102 and the rotor core 42 in the axial direction. In this case, the number of parts is reduced.

Figure 6:
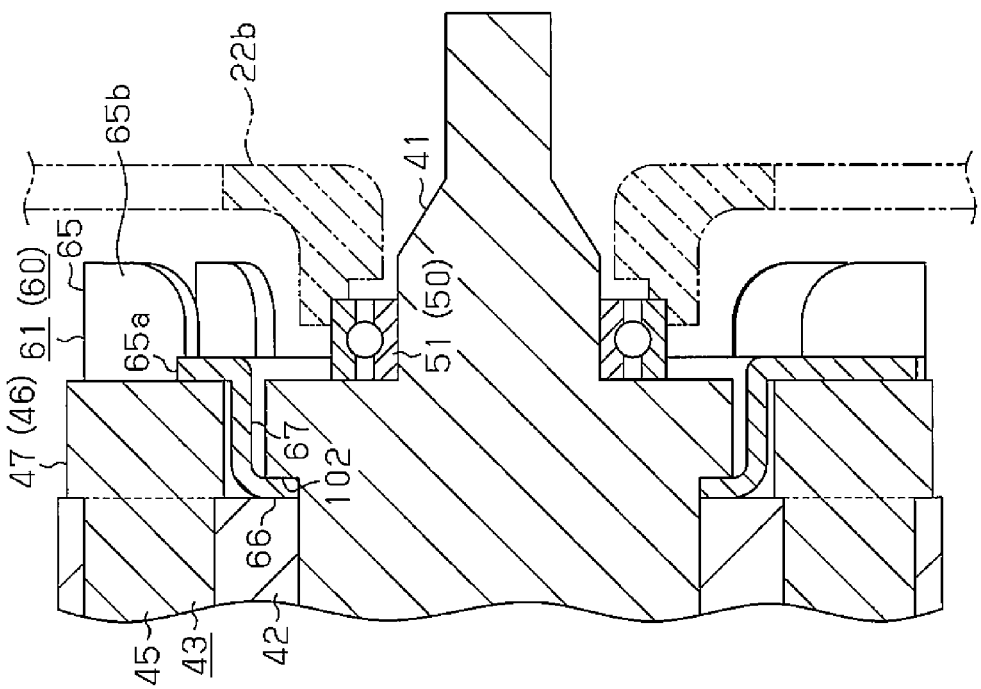
FIG. 6 is a schematic cross-sectional view of part of an induction machine according to a modification.

In FIG. 1, the end rings 46, 47 do not contact the blades 65 of the cooling fans 60, 61. However, as shown in FIG. 6, the end rings 46, 47 may contact the blades 65 of the cooling fans 60, 61 so that heat generated in the end rings 46, 47 is transmitted to the cooling fans 60, 61 to cool the end rings 46, 47. Instead of bringing the end rings 46, 47 directly in contact with the cooling fans 60, 61, the end rings 46, 47 may be thermally coupled to the cooling fans 60, 61 via heat radiating members.

As described above, thermally coupling the blades 65 with the end rings 46, 47 by, for example, bringing them into contact allows heat generated in the end rings 46, 47 to be transmitted to the cooling fans 60, 61 to cool the end rings 46, 47. In FIG. 6, an insulating film may be attached to the surfaces of the blades 65 to reliably insulate the cooling fans 60, 61 from the end rings 46, 47.

Figure 7:
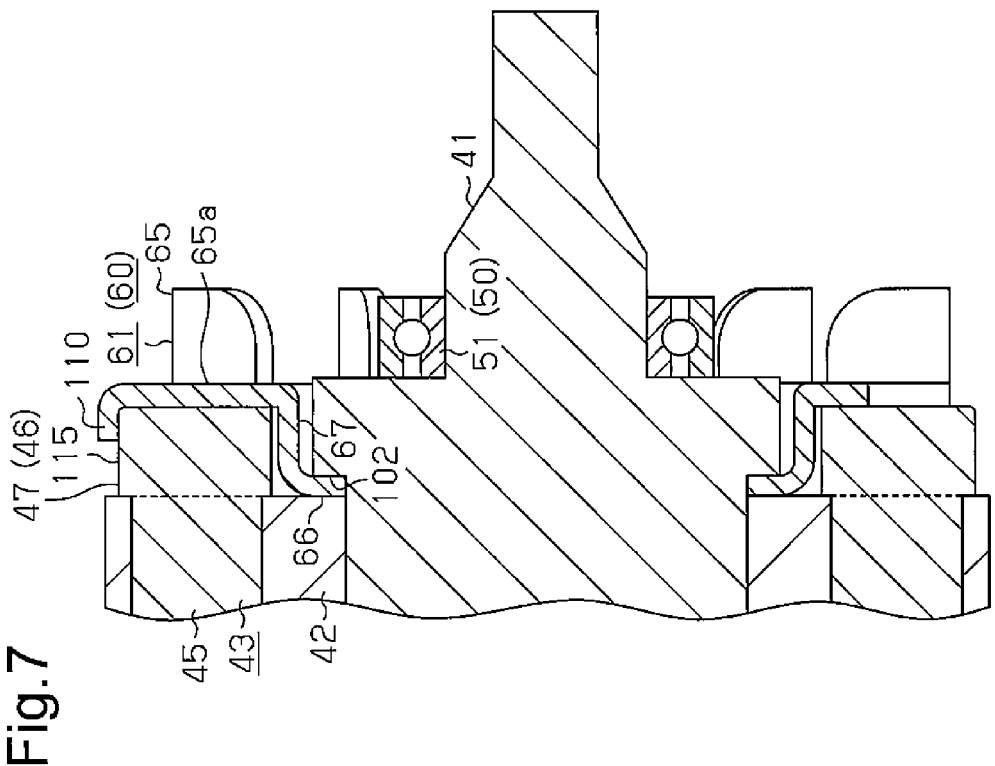
FIG. 7 is a schematic cross-sectional view of part of an induction machine according to a modification.
Figure 8:
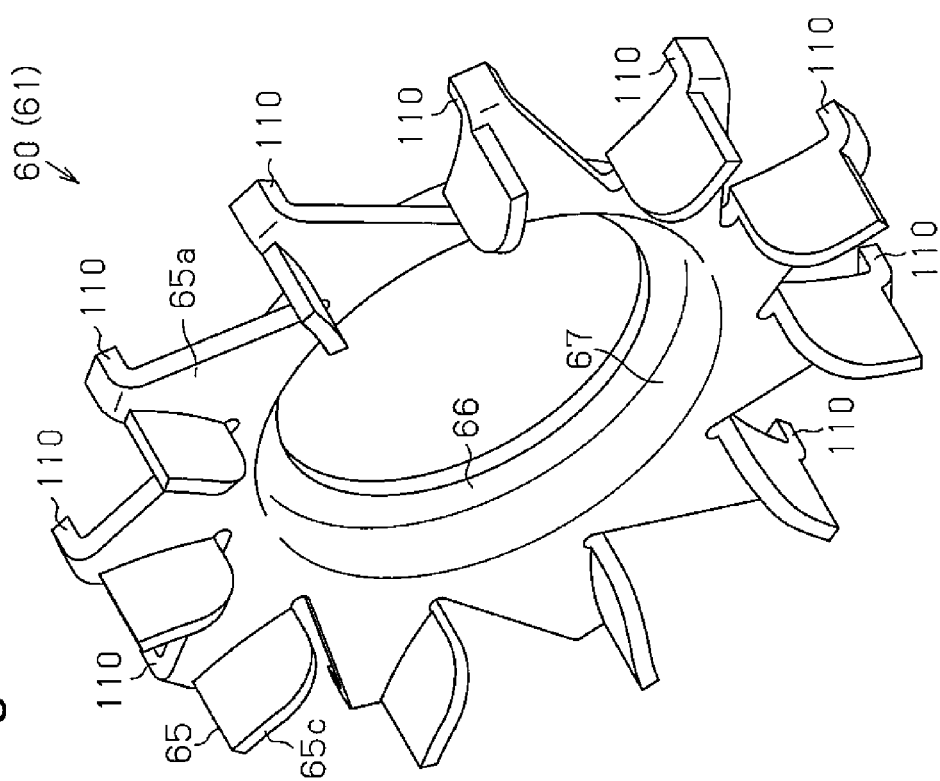
FIG. 8 is a perspective view of a cooling fan according to the modification.

As shown in FIGS. 7 and 8, the cooling fans 60, 61 may include end ring holders 110, which extend from the blades 65 in the axial direction. The end ring holders 110 are formed by plates. As shown in FIG. 8, the end ring holders 110 are formed on radially outer ends of the blades 65 of the cooling fans 60, 61 such that the end ring holders 110 are bent with respect to the blades 65 to extend toward the end rings 46, 47. That is, the end ring holders 110 are formed when forming the cooling fans 60, 61 by bending and drawing. As shown in FIG. 7, the end ring holders 110 are positioned on the outer circumferential surfaces 115 of the end rings 46, 47.

During high speed operation, although centrifugal force that tends to expand the end rings 46, 47 radially outward acts on the end rings 46, 47, the end ring holders 110 hold the end rings 46, 47 from the outside in the radial direction.

As shown in FIGS. 7 and 8, in the structure in which the end rings 46, 47 are retained with the cooling fans 60, 61, the end rings 46, 47 and the cooling fans 60, 61 are formed as separate bodies. Thus, material that has a strength higher than that of the end rings 46, 47 can be selected as the material of the cooling fans 60, 61, and the strength of the rotor can be increased. Furthermore, bringing the cooling fans 60, 61 into surface contact with the end rings 46, 47 improves the cooling efficiency. Furthermore, the shape of the sections (the securing portion 66 and the extended portion 67) of the cooling fans 60, 61 that are required to secure the cooling fans 60, 61 to the shaft 41 may be a cup shape (recess), which can be formed by drawing a plate-like material. The cup-shaped section receives the fan securing means, which is the protrusion 102 of the shaft 41 in this modification. Furthermore, the cooling fans 60, 61 have the shape that can be formed by cutting and bending. As a result, the induction machine 10 is easily manufactured without increasing its axial dimension, and an induction machine is provided that is capable of rotating at a high speed, has high cooling performance and strength, and is reduced in size. With the structure shown in FIGS. 7 and 8 also, the cooling fans 60, 61 are reliably insulated from the end rings 46, 47 by attaching insulating films on the surfaces of the blades 65.

Figure 9:
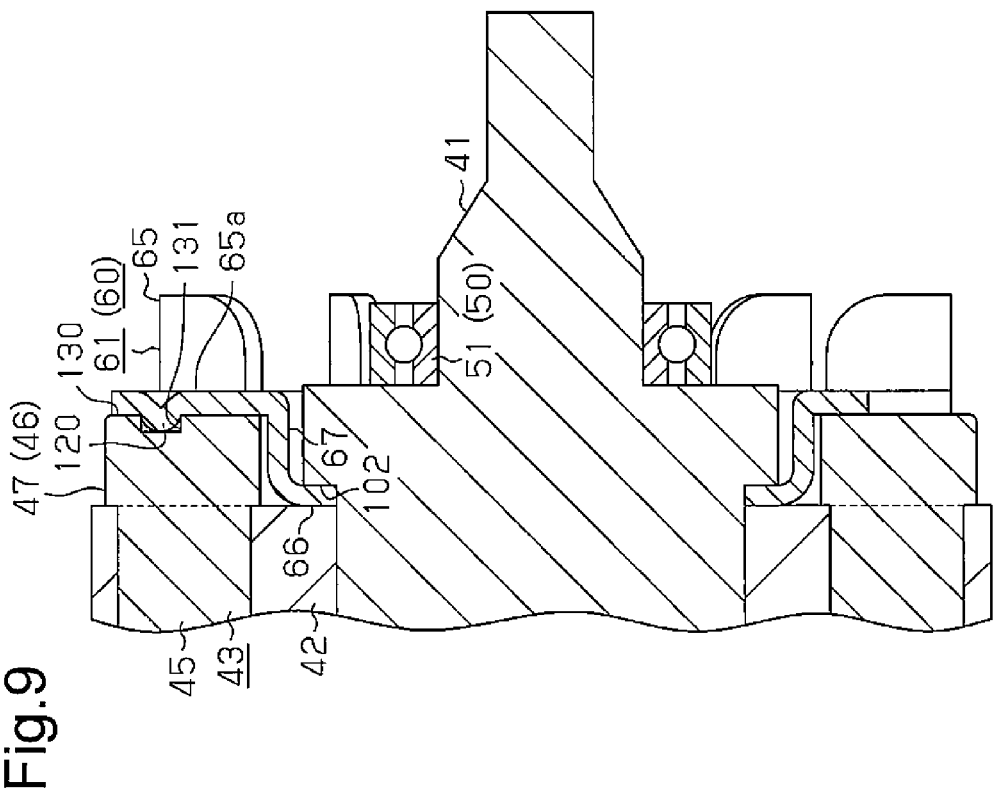
FIG. 9 is a schematic cross-sectional view of part of an induction machine according to a modification.

Instead of the end ring holders 110 positioned on the outer circumferential surfaces of the end rings 46, 47 as shown in FIGS. 7 and 8, the structure for holding the end rings 46, 47 may be protrusions (120) formed on the cooling fans 60, 61 engaged with recesses (or grooves) 131 formed on the end rings 46, 47 as shown in FIG. 9. More specifically, the end ring holders 120 are located on the blades 65 of the cooling fans 60, 61, and the end ring holders 120 engage with the recesses 131 located on end surfaces 130 of the end rings 46, 47. The end ring holders 120 are protrusions that project from the flat portions 65*a* of the blades 65 toward the end rings 46, 47 and are arranged in the circumferential direction. The end ring holders 120 are formed by drawing when forming the cooling fans 60, 61 by bending and drawing. On the end surface 130 of each of the end rings 46, 47, the recesses 131 are formed at positions corresponding to the end ring holders 120. The end ring holders (projections) 120 are fitted in the recesses 131.

The end ring holders 120, which engage with the recesses 131 of the end rings 46, 47, hold the end rings 46, 47 such that the end rings 46, 47 do not expand radially outward by centrifugal force. With this structure, the material of the cooling fans 60, 61 is reduced as compared to the structure shown in FIGS. 7 and 8. In the structure shown in FIG. 9 also, the cooling fans 60, 61 are reliably insulated from the end rings 46, 47 by attaching the insulating films on the surfaces of the blades 65.

The cooling fan is provided on each end of the shaft 41 in the axial direction, but may be provided on only one end of the shaft 41 in the axial direction.

DESCRIPTION OF THE REFERENCE NUMERALS

10 . . . Induction Machine, 20 . . . Housing, 30 . . . Stator, 31 . . . Stator Core, 32 . . . Coil, 32a, 32b . . . Coil End, 40 . . . Rotor, 41 . . . Shaft, 42 . . . Rotor Core, 43 . . . Secondary Conductor, 45 . . . Rotor Bar, 46, 47 . . . End Ring, 50, 51 . . . Bearing, 60, 61 . . . Cooling Fan, 65 . . . Blade, 65c . . . Distal End, 66 . . . Securing Portion, 67 . . . Extended Portion, 100 . . . Securing Member, 101 . . . Securing Member, 102 . . . Protrusion, 110 . . . End Ring Holder, 115 . . . Outer Circumferential Surface, 120 . . . End Ring Holder, 130 . . . End Surface, 131 . . . Recess.

The invention claimed is:

1. An induction machine comprising:
a housing;
a stator, which is arranged in the housing and includes a stator core and a coil;
a rotor, which includes a shaft, a rotor core secured to the shaft, and a secondary conductor, wherein the secondary conductor includes a rotor bar and an end ring;
a bearing, which is arranged in the housing and rotationally supports the shaft;
a cooling fan, which is arranged in the housing and includes a blade; and
a ring shaped cooling fan fixture, which secures the cooling fan to the rotor, wherein
the blade is located axially outward of the end ring,
a distal end of the blade in an axial direction extends axially outward of a coil end of the coil,
the cooling fan includes a securing portion, which is located radially inward of the end ring, and a cylindrical extended portion, which extends in the axial direction from the securing portion to the blade,
the securing portion is secured to the rotor with the cooling fan fixture,
the cooling fan fixture is a separate body from the cooling fan and is located in a region radially inward of the cylindrical extended portion, and
the bearing is located axially inward of the distal end of the blade.

2. The induction machine according to claim 1, wherein the cooling fan fixture is a securing member, which sandwiches the securing portion between the securing member and the rotor core in the axial direction.

3. The induction machine according to claim 1, wherein the cooling fan fixture is a securing member, which sandwiches the securing portion between the securing member and a protrusion of the shaft in the axial direction.

4. The induction machine according to claim 1, wherein the blade is located radially outward of an inner circumference of the end ring.

5. The induction machine according to claim 1, wherein the cooling fan is formed of a plate.

6. The induction machine according to claim 1, wherein the blade is thermally coupled to the end ring.

7. The induction machine according to claim 6, wherein the blade is in contact with the end ring.

8. The induction machine according to claim 6, wherein the cooling fan includes an end ring holder, which extends in the axial direction from the blade.

9. The induction machine according to claim 8, wherein the end ring holder is positioned on an outer circumferential surface of the end ring.

10. The induction machine according to claim 8, wherein the end ring holder engages with a recess formed in an end surface of the end ring.

11. The induction machine according to claim 1, wherein the cooling fan fixture radially protrudes from the shaft.

12. An induction machine comprising:
a housing;
a stator, which is arranged in the housing and includes a stator core and a coil;
a rotor, which includes a shaft, a rotor core secured to the shaft, and a secondary conductor, wherein the secondary conductor includes a rotor bar and an end ring;
a bearing, which is arranged in the housing and rotationally supports the shaft;
a cooling fan, which is arranged in the housing and includes a blade; and
a cooling fan fixture, which secures the cooling fan to the rotor, wherein
the blade is located axially outward of the end ring,
a distal end of the blade in an axial direction extends axially outward of a coil end of the coil,
the cooling fan includes a securing portion, which is located radially inward of the end ring, and a cylindrical extended portion, which extends in the axial direction from the securing portion to the blade,
the securing portion is secured to the rotor with the cooling fan fixture,
the cooling fan fixture is a separate body from the cooling fan and is located in a region radially inward of the cylindrical extended portion,
the bearing is located axially inward of the distal end of the blade, and
the cooling fan fixture is a protrusion located on the shaft to sandwich the securing portion between the protrusion and the rotor core in the axial direction.

13. An induction machine comprising:
a housing;
a stator, which is arranged in the housing and includes a stator core and a coil;
a rotor, which includes a shaft, a rotor core secured to the shaft, and a secondary conductor, wherein the secondary conductor includes a rotor bar and an end ring;
a bearing, which is arranged in the housing and rotationally supports the shaft;
a cooling fan, which is arranged in the housing and includes a blade; and
a cooling fan fixture, which secures the cooling fan to the rotor, wherein
the blade is located axially outward of the end ring,
a distal end of the blade in an axial direction extends axially outward of a coil end of the coil, the cooling fan includes a securing portion, which is located radially inward of the end ring, and a cylindrical extended portion, which extends in the axial direction from the securing portion to the blade, the securing portion is secured to the rotor with the cooling fan fixture, the cooling fan fixture is a separate body from the cooling fan and is located in a region radially inward of the cylindrical extended portion, the bearing is located axially inward of the distal end of the blade, and the cooling fan fixture radially protrudes from the shaft to sandwich the securing portion between the cooling fan fixture and the rotor core or between the cooling fan fixture and a protrusion of the shaft in the axial direction.

\* \* \* \* \*